US012561442B2

(12) United States Patent　　　　　(10) Patent No.:　US 12,561,442 B2
Karas et al.　　　　　　　　　　　　(45) Date of Patent:　Feb. 24, 2026

(54) PRIORITIZING VULNERABILITIES

(71) Applicant: JFROG LTD., Netanya (IL)

(72) Inventors: Asaf Karas, Ramat Gan (IL); Shachar Menashe, Herzliya (IL); Tal Zarfati, Givatayim (IL)

(73) Assignee: JFROG LTD., Netanya (IL)

( * ) Notice: Subject to any disclaimer, the term of this patent is extended or adjusted under 35 U.S.C. 154(b) by 336 days.

(21) Appl. No.: 17/550,334

(22) Filed: Dec. 14, 2021

(65) Prior Publication Data

US 2023/0185921 A1　　Jun. 15, 2023

(51) Int. Cl.
*G06F 21/57*　　　　(2013.01)
(52) U.S. Cl.
CPC ...... *G06F 21/577* (2013.01); *G06F 2221/033* (2013.01)
(58) Field of Classification Search
CPC .......................... G06F 21/577; G06F 2221/033
See application file for complete search history.

(56) References Cited

U.S. PATENT DOCUMENTS

| | | | | |
|---|---|---|---|---|
| 9,692,778 B1 * | 6/2017 | Mohanty | ............. | G06F 9/45533 |
| 9,825,981 B2 * | 11/2017 | Roytman | .............. | G06F 21/577 |
| 10,650,150 B1 * | 5/2020 | Rajasooriya | ............. | G06N 7/01 |
| 11,720,686 B1 * | 8/2023 | Cross | .................... | G06F 21/577 |
| | | | | 726/25 |

| | | | | |
|---|---|---|---|---|
| 2014/0173737 A1 * | 6/2014 | Toback | ................... | G06F 21/57 |
| | | | | 726/25 |
| 2014/0189873 A1 * | 7/2014 | Elder | ................. | H04L 63/1433 |
| | | | | 726/25 |
| 2017/0098087 A1 * | 4/2017 | Li | ........................ | H04L 63/1416 |
| 2018/0375891 A1 * | 12/2018 | Juncker | ................. | H04L 63/104 |
| 2021/0173940 A1 * | 6/2021 | Mylrea | ................. | G06F 16/953 |
| 2023/0075290 A1 * | 3/2023 | Wåreus | ................. | G06F 21/577 |
| 2024/0241963 A1 * | 7/2024 | Wareus | ................. | G06F 21/577 |

FOREIGN PATENT DOCUMENTS

WO　　WO-2022153412 A1 * 7/2022

* cited by examiner

*Primary Examiner* — Hadi S Armouche
(74) *Attorney, Agent, or Firm* — PEARL COHEN ZEDEK LATZER BARATZ LLP

(57) ABSTRACT

A method, system and product are provided including obtaining a list of vulnerabilities of an execution environment of a device, analyzing the execution environment to determine contextual factors of the execution environment, and adjusting the list of vulnerabilities based on the contextual factors. This provides a device-specific list of vulnerabilities configured to indicate an estimated impact of each listed vulnerability. Adjusting the list includes at least one of removing a first vulnerability from the list in case that exploitation of the first vulnerability is prevented in the device by the contextual factors, decreasing a score of a second vulnerability of the list in case the contextual factors mitigate an exploitation of the second vulnerability, and increasing a score of a third vulnerability of the list in case that the contextual factors increase a risk of an exploitation of the third vulnerability.

18 Claims, 3 Drawing Sheets

PRIORITIZING VULNERABILITIES

TECHNICAL FIELD

The present disclosure relates to prioritizing vulnerabilities in general, and to methods, systems and products for prioritizing vulnerabilities of a device based on a contextual analysis of the device, in particular.

BACKGROUND

Computerized devices control almost every aspect of our life—from writing documents to controlling traffic lights. However, computerized devices are bug-prone, and thus require a testing phase in which the bugs should be discovered. The testing phase is considered one of the most difficult tasks in designing a computerized device. The cost of not discovering a bug may be enormous, as the consequences of the bug may be disastrous. For example, a bug may cause the injury of a person relying on the designated behavior of the computerized device. Additionally, a bug may be expensive to fix, as patching it requires recall of the computerized device. Hence, many developers of computerized devices invest a substantial portion, such as 70% of the development cycle to discover erroneous behaviors of the computerized device.

Most of the code appearing in modern software originates in third party, publicly known libraries and programs. A vast majority of the relied upon libraries and programs contain bugs which may have security implications. Such bugs may be catalogued in public databases, and enumerated by Common Vulnerability Enumerations (CVEs). Complex software products typically rely on third party products, which have tens, hundreds, or thousands of listed CVEs. In some cases, the practical meaning of each CVE may be different for different products.

BRIEF SUMMARY

One exemplary embodiment of the disclosed subject matter is a computer program product comprising a non-transitory computer readable storage medium retaining program instructions, which program instructions when read by a processor, cause the processor to: obtain a list of vulnerabilities of an execution environment of a device; analyze the execution environment to determine one or more contextual factors of the execution environment; and adjust the list of vulnerabilities based on the one or more contextual factors, thereby providing a device-specific list of vulnerabilities, wherein the device-specific list of vulnerabilities is configured to indicate an estimated impact of each listed vulnerability on the device, wherein the adjustment of the list of vulnerabilities comprises at least one of: removing a first vulnerability from the list of vulnerabilities in case that exploitation of the first vulnerability is prevented in the device by the one or more contextual factors, whereby the device-specific list of vulnerabilities excludes the first vulnerability; decreasing a score of a second vulnerability of the list of vulnerabilities in case that the one or more contextual factors mitigate an exploitation of the second vulnerability, whereby the device-specific list of vulnerabilities includes the second vulnerability with a decreased score; and increasing a score of a third vulnerability of the list of vulnerabilities in case that the one or more contextual factors increase a risk of an exploitation of the third vulnerability, whereby the device-specific list of vulnerabilities includes the third vulnerability with an increased score.

Optionally, the list of vulnerabilities is obtained by: analyzing the execution environment to extract identifiers of software modules thereof, determining lookup keys based on the identifiers of the software modules, and extracting the list of vulnerabilities from a database using the lookup keys.

Optionally, the list of vulnerabilities comprises a list of respective Common Vulnerability Enumerations (CVEs), wherein the list of CVEs is associated with respective Common Vulnerability Scoring System (CVSS) scores.

Optionally, the second vulnerability is associated with a high CVSS score, wherein the third vulnerability associated with a low CVSS score, wherein the high CVSS score of the second vulnerability is greater than the low CVSS score of the third vulnerability, wherein after said decreasing and said increasing, the score of the third vulnerability is greater than the score of the second vulnerability in the device-specific list of vulnerabilities.

Optionally, the device-specific list of vulnerabilities lists the third vulnerability before the second vulnerability.

Optionally, the scores of the second and third vulnerabilities correspond to a position of the second and third vulnerabilities in the device-specific list of vulnerabilities.

Optionally, the program instructions, when read by the processor, cause the processor to: determine that a potential modification to the execution environment is operative to cause a change to the one or more contextual factors; and determine an effect of the change to the one or more contextual factors on the device-specific list of vulnerabilities.

Optionally, the program instructions, when read by the processor, cause the processor to: determine that the effect comprises adding the first vulnerability to the device-specific list of vulnerabilities; and in response to the determination that the effect comprises adding the first vulnerability, alert a user that the potential modification causes the device to be vulnerable to an exploitation of the first vulnerability.

Optionally, the one or more contextual factors comprise a preventing factor, wherein the preventing factor is a factor that is potentially instrumental in preventing an exploitation of a vulnerability.

Optionally, the program instructions, when read by the processor, cause the processor to refrain from including the vulnerability in the device-specific list of vulnerabilities.

Optionally, the one or more contextual factors comprise a mitigating factor, wherein the mitigating factor is a factor that is instrumental in mitigating an exploitation of a vulnerability.

Another exemplary embodiment of the disclosed subject matter is a method comprising: obtaining a list of vulnerabilities of an execution environment of a device; analyzing the execution environment to determine one or more contextual factors of the execution environment; and adjusting the list of vulnerabilities based on the one or more contextual factors, thereby providing a device-specific list of vulnerabilities, wherein the device-specific list of vulnerabilities is configured to indicate an estimated impact of each listed vulnerability on the device, wherein said adjusting comprises at least one of: removing a first vulnerability from the list of vulnerabilities in case that exploitation of the first vulnerability is prevented in the device by the one or more contextual factors, whereby the device-specific list of vulnerabilities excludes the first vulnerability; decreasing a score of a second vulnerability of the list of vulnerabilities in case that the one or more contextual factors mitigate an exploitation of the second vulnerability, whereby the device-specific list of vulnerabilities includes the second vulnerability with a decreased score; and increasing a score of a third vulnerability of the list of vulnerabilities in case that the one or more contextual factors increase a risk of an exploitation of the third vulnerability, whereby the device-specific list of vulnerabilities includes the third vulnerability with an increased score.

Yet another exemplary embodiment of the disclosed subject matter is a system comprising a processor and coupled memory, the processor being adapted to: obtain a list of vulnerabilities of an execution environment of a device; analyze the execution environment to determine one or more contextual factors of the execution environment; and adjust the list of vulnerabilities based on the one or more contextual factors, thereby providing a device-specific list of vulnerabilities, wherein the device-specific list of vulnerabilities is configured to indicate an estimated impact of each listed vulnerability on the device, wherein the adjustment of the list of vulnerabilities comprises at least one of: removing a first vulnerability from the list of vulnerabilities in case that exploitation of the first vulnerability is prevented in the device by the one or more contextual factors, whereby the device-specific list of vulnerabilities excludes the first vulnerability; decreasing a score of a second vulnerability of the list of vulnerabilities in case that the one or more contextual factors mitigate an exploitation of the second vulnerability, whereby the device-specific list of vulnerabilities includes the second vulnerability with a decreased score; and increasing a score of a third vulnerability of the list of vulnerabilities in case that the one or more contextual factors increase a risk of an exploitation of the third vulnerability, whereby the device-specific list of vulnerabilities includes the third vulnerability with an increased score.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
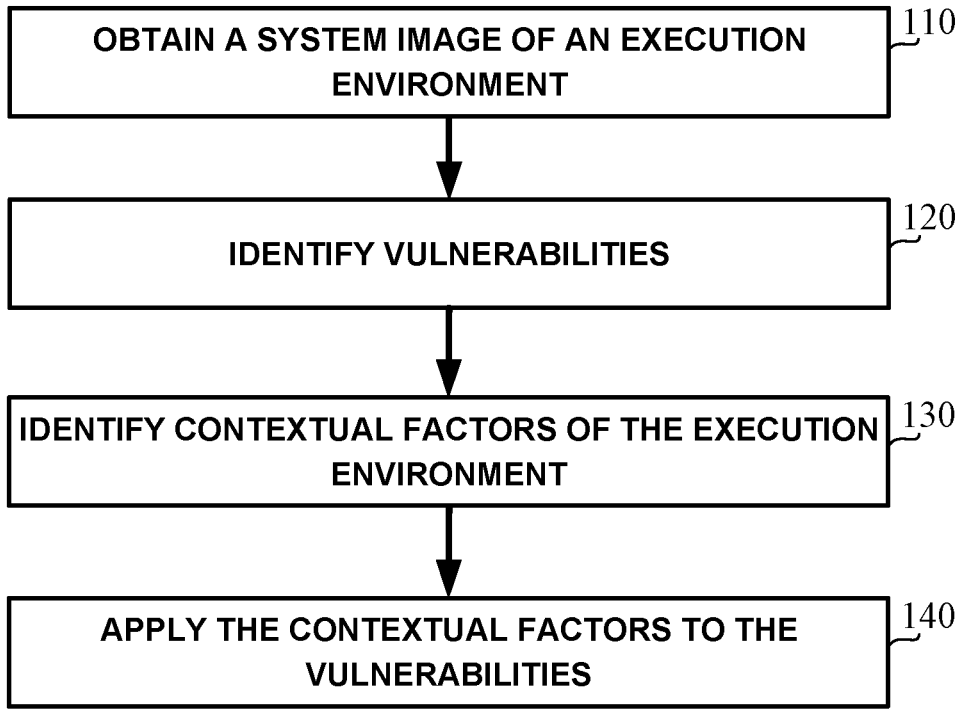
FIG. 1 illustrates a flowchart diagram of a method, in accordance with some exemplary embodiments of the disclosed subject matter.

One technical problem dealt with by the disclosed subject matter is to detect an impact of vulnerabilities or bugs of a device, on the device. For example, it may be desired to detect an impact of publicly known vulnerabilities that originate in publicly available programs or libraries, e.g., libraries that are used in a software composition of a device, on the specific device. As another example, it may be desired to detect an impact of privately known vulnerabilities that originate in programs or libraries, e.g., known libraries that are used in a software composition of a device, on the specific device. In some exemplary embodiments, a vulnerability of a device, a system, a product, an environment, a software, a firmware, or the like (hereinafter a "device"), may include a weakness that can be exploited by an actor, such as an attacker or a malicious user, in order to perform unauthorized actions within a computer system.

Another technical problem dealt with by the disclosed subject matter is prioritizing or rating a list of vulnerabilities according to their impact on the underlying device. In many cases, devices may have a security vulnerabilities with ranging impacts, some of which may be publicly known, privately retained with additional information, or the like.

Yet another technical problem dealt with by the disclosed subject matter is providing or generating a list of vulnerabilities of a device that has a reduced number of vulnerabilities, that has a reduced fix requirement, or the like. In some cases, extracting vulnerabilities of a device may provide a long list of hundreds, thousands, or the like of vulnerabilities. In some exemplary embodiments, it may be extremely challenging to fix all of the identified vulnerabilities, as such a fix may be time consuming and resource extensive. For example, products may be shipped with outdated software components, older operating systems, outdated or deprecated third-party software, or the like, which may often include over a thousand of known security vulnerabilities.

In some exemplary embodiments, vulnerabilities of a device may comprise Common Vulnerability Enumerations (CVEs), which may refer to a security flaw. In some exemplary embodiments, CVEs may be assigned with a CVE identifier (ID). In some exemplary embodiments, extracted lists of CVEs may comprise computer security flaws, flaws that are publicly disclosed, flaws that are privately retained in a database, or the like. In some exemplary embodiments, CVEs may be associated or retained with a respective score, such as a default Common Vulnerability Scoring System (CVSS) score, which may be listed by public CVE databases. In some exemplary embodiments, a CVSS may indicate a severity of the corresponding CVE. For example, CVSS may range from zero (0) to ten (10), indicating no severity (0), low severity (0.1-3.9), medium severity (4-6.9), high severity (7-8.9) and critical severity (9-10). In some exemplary embodiments, CVSS may indicate general severity of the corresponding CVE without taking into account specific factors related to the execution environment in which the CVE exists (e.g., the device and its properties).

A naïve solution to prioritizing vulnerabilities of a device may include identifying associated vulnerabilities of a product, extracting their CVSS scores, and utilizing the vulnerabilities' CVSS score in order to prioritize vulnerabilities. According to the naïve solution, vulnerabilities with higher CVSS scores, such as above a threshold, may be fixed, while the lower scored vulnerabilities may not be fixed, e.g., in order to spare resources. In some exemplary embodiments, the a naïve solution may have one or more drawbacks, at least since prioritizing vulnerabilities of a device may produce an oversized vulnerability report, including hundreds or thousands of vulnerabilities, that cannot all be addressed. This makes fixing or patching all vulnerabilities, even over a given severity threshold, prohibitively costly and resource consuming. An additional drawback of the naïve solution is its full reliance on CVSS scores, which are fixed for each CVE, are often disputed, and ignore the specifics of each product. For example, a CVE may have a high CVSS score, and thus may be prioritized for being fixed, although the device may not be vulnerable to the CVE due to having configurations that prevent exploitation of the CVE. As an example, one CVE may relate to exploitation that enables an attacker to take control over a specific port. However, if the relevant port is blocked by the device, such CVE does not pose any threat under the specific configuration of the device and accordingly may remain unfixed without posing a security threat.

One technical solution of the disclosed subject matter is to prioritize vulnerabilities in a device, based contextual factors and properties of the device. In some exemplary embodiments, an execution environment of the device may be analyzed. In some exemplary embodiments, the execution environment may comprise a binary of the device (also referred to as "binary image"), drivers thereof, sensors thereof, system files, executables, hardware components, software components, configurations, settings, applications, or the like. In some exemplary embodiments, the execution environment may comprise or depict a firmware of a device, a software of a device, a software container that decouples applications from underlying host infrastructure for cloud-platform deployment, a unit of software, a mobile application, an individual software package, or the like. In some exemplary embodiments, the execution environment may be analyzed directly, via a system image depicting the execution environment of the device, or the like. In some cases, the system image may comprise a serialized copy of the state of the device, a restored state of the device, a backup of a hard drive of the device, one or more files that store a copy of the hard drive of the device, a snapshot of the device's system, or the like. For example, the system image may comprise a serialized copy of the full state of the device, a serialized copy of one or more elements of the device, or the like. In some exemplary embodiments, the execution environment may be analyzed in order to identify and prioritize vulnerabilities thereof, e.g., using a vulnerability analysis and a contextual analysis.

In some exemplary embodiments, during a vulnerability analysis, the binary of the device, or an execution environment thereof, may be analyzed in order to identify and/or extract software components thereof such as software modules, sub-modules, software packages utilized thereby, included libraries, software dependencies, or the like. For example, analyzing the binary may include analyzing a binary image within the system image. In some exemplary embodiments, a binary of the device may analyzed directly, extracted from the system image, or the like, and analyzed to identify the software components of the binary. Alternatively, any other portion of the execution environment may be analyzed, in addition to or instead of the binary. In some exemplary embodiments, the binary, the execution environment of the binary, or the like, may be analyzed to extract identifiers of third party software modules thereof, which may be provided by a provider different than a developer of the device, identifiers of first party software modules provided by the developer of the device, or the like. In some cases, the software modules may be developed separately from the analyzed binary and recognized, privately or publicly, as separate entities with their own versions, names, or the like. In other cases, the software modules may be developed together with the analyzed binary, such as by a same provider, developer, or the like. In some cases, the analysis of the binary and/or its environment may be performed without analyzing the software modules themselves apart from extracting their version numbers, their identifiers, their names, or the like, which may be subsequently utilized for looking up CVEs. In some exemplary embodiments, the binary may be analyzed in order to identify software component names, versions, types, or the like, and determine canonical lookup keys of CVEs based on the identified software modules, their properties, or the like. In some exemplary embodiments, one or more software components, modules, binaries, files, or the like, may each correspond to at least one vulnerability. In some exemplary embodiments, the software components of the binary may be used to extract associated vulnerabilities or CVEs of the device from one or more CVE databases. In some exemplary embodiments, the list of vulnerabilities may be extracted from a public or private database using the canonical lookup keys, thereby obtaining a list of vulnerabilities of the device.

In some exemplary embodiments, during a contextual analysis, the execution environment may be analyzed in order to determine one or more contextual factors of the execution environment, such as configurations, settings, properties, compiler protections, system initialization, application execution flow, privileges, mitigations, runtime protecting agents, such as disclosed in U.S. Pat. No. 10,534,918, entitled "Firmware Verification", dated Jan. 14, 2020, which is hereby incorporated by reference in its entirety for all purposes, or the like. In some exemplary embodiments, the execution environment may be analyzed directly, via the system image, or the like. In some exemplary embodiments, the contextual factors may comprise preventing factors that can prevent an exploitation of a vulnerability, mitigating factors that can mitigate an exploitation of a vulnerability, factors that increase a probability of exploiting a vulnerability, or the like. In some exemplary embodiments, the contextual analysis may be configured to identify a reachability path of each CVE in the execution environment, the posed threat level of each CVE in the execution environment, or the like.

In some exemplary embodiments, the contextual analysis may be performed simultaneously to the vulnerability analysis, in partially overlapping timeframes, thereafter, therebefore, or the like. In some exemplary embodiments, the extracted list of vulnerabilities obtained from the vulnerability analysis may be adjusted based on the contextual factors that are identified by the contextual analysis, thereby providing a device-specific list of vulnerabilities. In some exemplary embodiments, the device-specific list of vulnerabilities that is generated according to the disclosed subject matter may be configured to indicate an estimated impact of each listed vulnerability on the underlying device. In some exemplary embodiments, the device-specific list of vulnerabilities may be ordered according to a determined priority that comprises the estimated impact of each listed vulnerability on the underlying device.

In some exemplary embodiments, the contextual analysis may comprise performing a system context harvest, during which system-wide context data, such as the contextual factors, may be collected and used to determine a relevance of the CVEs that were found in the CVE lookup. In some exemplary embodiments, after collecting the contextual factors at the context harvest, a CVE-specific context analysis may be performed to identify an impact of each CVE on the underlying device. In some exemplary embodiments, for each of the collected CVEs obtained in the CVE lookup, an algorithm or mechanism for concluding the applicability of the CVE in the given execution environment may be assigned. In some exemplary embodiments, the contextual factors of the system-wide context may be analyzed, examined, or the like, in order to identify the impact of the CVE on the device, the impact of the contextual factors on potential exploitations of a given CVE on the device, or the like. The impact may be determined using static analysis, dynamic analysis, utilization of a Machine Learning based predictor, using Deep Learning, or the like. In some exemplary embodiments, one or more conditions of each CVE of the device may be matched against the contextual factors of the device, in order to identify whether or not they apply to the specific properties of the device, whether the device includes components that neutralize the underlying threat, or the like.

In some exemplary embodiments, by combining the contextual factors, new relevance scores of the CVEs may be computed. In some exemplary embodiments, based on the contextual analysis of the system image, a new ranking and listing of the vulnerabilities may be determined, thereby generating a device-specific list of vulnerabilities according to their relevancy or impact in the underlying device. In some exemplary embodiments, the original list of CVEs may be processed to obtain a device-specific list of vulnerabilities, having a reduced number of CVEs compared to the original list of CVEs, and having an altered order of the remaining CVEs according to their determined priority, impact on the device, or the like. In some exemplary embodiments, each CVE in the original list of vulnerabilities may be modified in one of three ways: removing the CVE from the list, lowering the order or rank of the CVE in the list, or increasing the order or rank of the CVE in the list. In some cases, a CVE may remain in a same order of the original list. In some exemplary embodiments, the analysis may not introduce new CVE that was not already included in the original list of vulnerabilities into the list, but only remove existing CVE or change its relative position with respect to other CVEs in the list.

In some exemplary embodiments, one or more first vulnerabilities or CVEs from the extracted list of vulnerabilities may be removed from the list in case that the contextual factors prevent exploitation of the first vulnerabilities in the device. In some exemplary embodiments, one or more second vulnerabilities from the list of vulnerabilities may be allocated a decreased score, priority, or the like, with respect to its initial CVSS score, such as in case that the contextual factors mitigate an exploitation of the second vulnerabilities. In some exemplary embodiments, one or more third vulnerabilities or CVEs from the list of vulnerabilities may be allocated an increased score, priority, or the like, with respect to its initial CVSS score, in case that the contextual factors do not mitigate an exploitation of the third vulnerabilities, leaving the device vulnerable to exploitations of the third vulnerabilities.

In some exemplary embodiments, the device-specific list of vulnerabilities may be generated to exclude neutralized threats such as the first vulnerabilities, and to include the adjusted scores of vulnerabilities that were not entirely neutralized, not neutralized at all, vulnerabilities that the threat posed thereby is increased, or the like, such as the second and third vulnerabilities. In some exemplary embodiments, the device-specific list of vulnerabilities may be generated to include vulnerabilities according to a device-specific priority, in which vulnerabilities that are scored higher, as having the most impact on the device, are positioned higher in the list, and vice versa. In some exemplary embodiments, the impact scores of the vulnerabilities may be determined based on whether or not the contextual factors mitigate or prevent exploitation of each vulnerability, based on the initial CVSS scores, a combination thereof, or the like. In some exemplary embodiments, the new priority ranking of the vulnerabilities may be affected by contextual factors such as the reachability of the vulnerabilities in the current context of the system, indicating whether any portion of the execution environment accesses the vulnerable code, current configurations of the device, code protections, or the like. In some exemplary embodiments, the new ranking of the vulnerabilities may be affected by the original score of each CVE, such as its default CVSS score, its determined exploitation severity level, or the like.

In some exemplary embodiments, the device-specific list of vulnerabilities may comprise a first vulnerability that was originally listed above a second vulnerability in the extracted list of vulnerabilities. For example, the first vulnerability may have a higher CVSS score that the second vulnerability. In some exemplary embodiments, in contrast to the original list, the device-specific list of vulnerabilities may list the first vulnerability below the second vulnerability in the list order, such as in case the score of the first vulnerability is decreased or the score of the second vulnerability is increased, e.g., in case the contextual factors mitigate an exploitation of the first vulnerability, do not mitigate an exploitation of the second vulnerability, or even aggravate the threat posed by the second vulnerability. Alternatively, the device-specific list of vulnerabilities may list the first vulnerability before the second vulnerability in the list order, such as in case the first vulnerability is a crucial vulnerability, and the second vulnerability is not, as could be indicated by a gap between their respective CVSS scores. In some exemplary embodiments, after generating the device-specific list of vulnerabilities, the list may be presented to one or more users, operators, clients, or the like.

As an example, a CVE in a code library may relate to potential attack on cameras of various types. In some exemplary embodiments, for a first type of camera, the vulnerability may not be exploitable by an adversary, causing the camera to be safe from exploitation through the vulnerability. For a second type of camera, the same vulnerability may enable an adversary to alter an operation of the camera from remote, such as by restarting or shutting down the camera's computer. In some exemplary embodiments, such operation may be used in a Denial of Service (DoS) attack. For a third type of camera, the same vulnerability may enable an adversary to run arbitrary code on the camera's computer and take over control of the operation of the camera, its stored data, or the like. In this scenario, a contextual analysis at a camera of the first type, may prioritize the CVE lower than a contextual analysis at a camera of the second type, and a contextual analysis at a camera of the second type may prioritize the CVE lower than a contextual analysis at a camera of the third type. Accordingly, each device may rank the same CVE differently, based on distinguished contextual factors of each camera. In addition, in case the device is not connected to any camera, as may be indicated by the execution environment, the CVE may be disregarded and removed from the device-specific list of vulnerabilities, even if the CVSS of the CVE is relatively high, because in the specific environment in which the code library is utilized, such CVE has not practical effect.

In some exemplary embodiments, the device-specific list of vulnerabilities may be updated periodically, in response to an update instruction, in response to identifying an attempt or an intention to modify the software, in response to identifying an attempt to connect the device to another device, in response to identifying an attempt to change a hardware component of the device, or the like. In some exemplary embodiments, the vulnerability databases may be scanned periodically for new CVEs or updates to existing CVEs, which may result in changes to CVE scores or additions of new CVEs to an existing device, product, or the like.

In some exemplary embodiments, based on the product-specific list of CVEs, one or more real time alerts may be provided to a user. In some exemplary embodiments, upon determining that a potential modification to the execution environment, such as upgrading its operating system, changing its settings, attaching a sensor, or the like, will cause a change to the one or more contextual factors, an estimated effect of the change on the device-specific list of vulnerabilities may be determined. In some exemplary embodiments, the user may be alerted of estimated threats posed to the device in case the potential modification is implemented. For example, an estimated effect on the device-specific list of vulnerabilities may include adding to the device-specific list of vulnerabilities a previously-prevented vulnerability, that exploitation thereof is prevented by the previous contextual factors, and that exploitation thereof will not be prevented by the modified contextual factors in case the potential modification is implemented. In such a case, a user of the device, an operator, or the like, may be alerted that the potential modification causes the device to be vulnerable to an exploitation of the currently prevented vulnerability. In some exemplary embodiments, in case a CVE affects a certain version of a program, a configuration, a connection, or the like, that poses a threat to the underlying device, the user may be alerted against such scenarios. In some cases, generated alerts may indicate whether or not a software modification exposes the device to a vulnerability, increases the risk therefrom or otherwise poses a risk to the device, whether or not connecting to a hardware device exposes the device to a vulnerability, increases the risk therefrom or otherwise poses a danger to the device, whether or not a product or application exposes the device to a vulnerability, increases the risk therefrom or otherwise poses a danger to the device, alternative recommended upgrades for the device, or the like.

For example, a user of a device may be alerted that an application is dangerous or safe for her specific device, e.g., an IoT device she is developing, a device with embedded firmware she is developing, her server, her mobile phone, her laptop, or the like. As another example, the user may wish to upgrade the Operating System (OS) of a device to a new version thereof. Based on the conditions of the contextual factors, the new version of the OS may be determined to pose a threat to the user's device, and the user may be provided with a message indicating that the user should avoid from upgrading the OS. For example, the message may be presented in case the user browses a webpage that is configured to download the new version of the OS, indicating an intention of the user to upgrade the OS. As another example, the user may be alerted to avoid changing settings of a compiler to specific settings, or avoid from changing to a specific compiler. It is noted that similar analysis may be performed with respect to any upgrade of a software module, and the disclosed subject matter is not limited only to OS update.

One technical effect of utilizing the disclosed subject matter is enabling to prioritize vulnerabilities of a product according to the impact of the vulnerabilities on the underlying device. In some exemplary embodiments, the vulnerabilities may be prioritized by practical exploitability on the underlying product or device, rather than an abstract general score such as the CVSS score. In some exemplary embodiments, the disclosed subject matter enables to determine contextual factors that characterize the execution environment's functionalities, configurations, attributes, or the like, and identify which vulnerabilities impact the system in its current state based on the contextual factors.

Another technical effect of utilizing the disclosed subject matter enabling to fix relevant vulnerabilities that directly impact the device, thereby saving time and resources. The disclosed subject matter enables to remove from the list of vulnerabilities any vulnerabilities that have no impact on the device in its current configuration, state, or the like, thereby sparing resources. Vulnerabilities may be prioritized for a device, a product, a cloud, a program, or the like, during runtime.

Yet another technical effect may be to automatically assess potential impact of a change in the device configuration, such as updating software modules, utilizing different compilers, replacing hardware components, or the like. Such automated assessment may be utilized to prevent modifications that could introduce exploitable vulnerabilities do the device unknowingly. Instead, the user may be made aware of such potential impact, perform actions that are useful for mitigating the risk, determine whether such modification warrants the resource utilization required to address the potential impact, or the like.

Referring now to FIG. 1 showing a flowchart diagram of a method, in accordance with some exemplary embodiments of the disclosed subject matter.

On Step 110, a system image of an execution environment of a device, or any other indication of the execution environment, may be obtained, e.g., as an input of a prioritizing engine, component, or the like. Alternatively, a source code of the device may be obtained as an input, and analyzed to identify and prioritize vulnerabilities thereof. In some exemplary embodiments, some factors, such as compiler protections, system initialization and application execution flow, privileges, mitigations such as firewalls, or the like, may be easier to detect on the execution environment rather than on a source code. Accordingly, it may be advantageous to obtain the system image.

In some exemplary embodiments, a static analysis of the device's binary, as indicated by the execution environment, may be performed, enabling to detect its vulnerabilities prior to an execution of the binary, and to identify conditions that affect exploitations of the vulnerabilities.

On Step 120, during a vulnerability analysis, vulnerabilities of the binary may be determined, identified, extracted, or the like, e.g., using a static analysis phase and a CVE lookup process. In some exemplary embodiments, a CVE lookup process may be performed in order to identify vulnerabilities (e.g., CVEs) that correspond to a binary file, binary module, library, or the like. In some exemplary embodiments, in order to identify the CVEs of the binary, a static analysis phase may be configured to disassemble the binary into code patches of functionality, versions, libraries, or the like, which can be matched against publicly known vulnerabilities databases, privately retained vulnerabilities lists, or the like. In some exemplary embodiments, software versions and CVEs of the binary may be identified, by decomposing the binary into modules, sub-modules, or the like, e.g., which may be identified using a machine learning module, heuristics, or the like. In some exemplary embodiments, the binary may be decomposed to components using one or more techniques such as the reachability analysis for binary components as described in "Detection, assessment and mitigation of vulnerabilities in open source dependencies", June 2020, which is incorporated by reference herein in its entirety. In some exemplary embodiments, during a reachability analysis, function blocks may be identified from the binary and used to generate a call graph. In some exemplary embodiments, based on the decomposing analysis, a list of software package names, version, types, or the like, of the binary image, may be generated.

In some exemplary embodiments, the list of software component names may be used to extract a list of corresponding vulnerabilities from a vulnerability database, a vulnerability server, a vulnerability data source, or the like. In some exemplary embodiments, vulnerability databases may include the US National Vulnerability Database, databases that aggregate LINUX™ kernel CVEs, the ANDROID™ security bulletins, the DEBIAN™ security bulletins for the lookup, or the like. In some exemplary embodiments, an input decomposed module, such as a software module of the binary, may be converted into a list of one or more identifiable software package names and versions that can be used to extract CVE records, e.g., using methods such as binary comparison against a retained list of software packages, version string identification, conversion methods, canonical methods, or the like.

In some exemplary embodiments, during the CVE lookup process, software module names and versions, library names and versions, or the like, may be passed through a canonicalization step, in order to produce a standard or canonical key for CVE lookups in a public or private vulnerability databases. In some exemplary embodiments, software module names and versions may be converted to a form or format that matches the format of one or more vulnerability databases. In some exemplary embodiments, converting software module names and versions to a canonical form may produce a CVE identifier for each known vulnerability in the software module, which may correspond to a CVE record in one or more public or private vulnerability databases. In some exemplary embodiments, the CVE identifier may be used to retrieve a corresponding CVE record from the vulnerability database, including fields of the CVE record such as a CVSS score, a Common Weakness Enumeration (CWE), or the like. In some exemplary embodiments, subsequent to the CVE lookup process, a full original list of CVEs of the binary may be extracted. In some cases, in addition to extracting a CVE list from the binary, CVEs may be identified in other portions of the system image. In some exemplary embodiments, the full original list may comprise CVE entries, each including a CVE identifier and an associated a standard score, such as a global CVSS score. CVSS scores may comprise global scores of CVEs that are identical for every tested product, file, execution environment, driver, system, or the like, having the CVE.

On Step 130, contextual factors of the execution environment may be extracted, identified, determined, or the like, during a contextual analysis of the execution environment. In some exemplary embodiments, a contextual analysis of the execution environment may be performed to identify a relevance or influence of the identified security vulnerabilities that are obtained on Step 120, on the underlying device. In some exemplary embodiments, contextual factors in the execution environment may be identified, harvested, determined, or the like, based on an analysis of the execution environment. In some exemplary embodiments, the contextual factors may comprise system-wide context data, factors that can prevent exploitation of a CVE, factors that can mitigate exploitation of a CVE, factors that increase or decrease a difficulty of exploiting a CVE, or the like.

In some exemplary embodiments, contextual factors may comprise preventing factors that prevent an exploitation of a CVE, such as the vulnerable code not being reached by executables of the execution environment, the CVE being patched, having configurations that prevent exploitation of the CVE, or the like. In some exemplary embodiments, contextual factors or attributes of the execution environment that prevent exploitation may effectively drop the computed impact level of a CVE to zero.

In some exemplary embodiments, a preventing factor may comprise a contextual reachability of a CVE in the execution environment. In some exemplary embodiments, a reachability contextual factor may retain a state of reachability of the CVE in the binary image, conditions for reaching the vulnerable portion in executables of the execution environment, paths to the vulnerable portion, or the like. In some exemplary embodiments, the CVE's contextual reachability may indicate whether the vulnerable code is reached in the current context or configuration of the underlying execution environment. In contrast to detecting an existence of vulnerable code on the device, as may be done by reachability processes, contextual reachability may determine whether vulnerable code may be invoked by a running process. It is noted that contextual reachability may differ from reachability processes. In some cases, reachability processes may identify whether a function can be theoretically invoked by a system, while the contextual reachability may identify whether the function is in fact invoked by the execution environment in its current state. For example, a library that is not invoked in a system may be considered unreached, even if the library can be theoretically reached by the binary. In some exemplary embodiments, in case vulnerable code is not reached in the execution environment, an exploitation of the CVE may be determined to be prevented, ineffective, irrelevant, or the like.

In some exemplary embodiments, a vulnerability may comprise a CVE in a library of a system, e.g., in a function thereof. In some cases, the reachability of the library CVE may be determined by identifying whether an exported function from the library is imported in another binary of the system image, such as by the executable loading the library. In some exemplary embodiments, the execution environment may be examined to identify whether the vulnerable functions are invoked by the executables which load the library, or by any other executables. In case the execution environment does not import the function, an exploitation of the vulnerability may be determined to be prevented.

In some exemplary embodiments, a contextual analysis may be performed to identify conditions for reaching a vulnerability. For example, the conditions may include activating another function with certain arguments, activating a certain code line, or the like. In some exemplary embodiments, a code flow analysis may be applied to the binary image in order to identify whether the vulnerable functions or system portions are in fact invoked by the current binary image, e.g., based on compliance with the conditions. For example, a CVE may indicate that one or more library functions are vulnerable to an exploitation. In some exemplary embodiments, in case a code flow of the binary image indicates that the execution environment does not reach the library's vulnerable function, the CVE may be determined to be unreached, exploitation thereof prevented, or the like. In some exemplary embodiments, Dynamic-Link Library (DLL) files of the entire system's code may be examined in order to identify any usage of a vulnerable library, and ensure that the vulnerable function of the library is not invoked in the execution environment. In some exemplary embodiments, the data path to the vulnerable portion or the conditions for implementing the vulnerable portion may be analyzed to determine whether the execution environment reaches the vulnerable portion. For example, the contextual analysis may determine that reaching the vulnerable portion requires to first activate two other functions, and the binary image may be analyzed to identify whether the functions are activated or not. In case they are not activated, exploitation of the vulnerability may be determined to be prevented.

In some cases, the contextual reachability of a vulnerability may be determined based on data flow control analysis. In some exemplary embodiments, data flow control analysis may be implemented to determine whether the vulnerable code can be reached with user-controlled data, making it exploitable in practice. In some cases, the data flow control analysis may create a graph of data objects that are referenced by functions, and passed as arguments to other functions, to determine whether the data objects reach the vulnerable code. In some cases, a generated call graph may comprise functions of the binary image as nodes, and function calls of the binary image as directed edges, over which search algorithms such as depth-first search may be executed to determine whether a path exists from the externally invoked functions to the vulnerable internal code. In case the vulnerable code is reached by potentially user-controlled data, the CVE may be exploitable in practice with attacker-control code. In some exemplary embodiments, data flow control analysis may determine whether any input validation is applied to the data, which may prevent exploitations of an attack vector.

In some exemplary embodiments, a preventing factor of a CVE may comprise identifying one or more detected patches in the binary. In some exemplary embodiments, a patch contextual factor may retain an identified patch in the binary that prevents exploitations of a CVE, conditions for preventing exploitations of the CVE by the patch, properties of the patch such as its estimated version, or the like. In some exemplary embodiments, instead of upgrading the vulnerable software to a new version, vendors may apply software patches selectively in order to protect the software against CVE exploitations ("backport patching"), without upgrading the entire binary. In some exemplary embodiments, software patches may be added to an old version of a software, in order to provide a protecting functionality that is similar to the new version of the software without upgrading to the new version.

In some exemplary embodiments, binary analysis techniques, or any other method, may be used to compare the binary to different versions of the binary, software patches thereof, or the like. In some exemplary embodiments, version information may be retained in a vulnerability database, in a server, or the like. In some exemplary embodiments, determining whether a given binary image comprises a known patch may comprise generating a fingerprint of a patch, and searching for the patch in the tested binary image, such as by using the fingerprint. In some exemplary embodiments, a fingerprint of a patch may be generated by comparing a first version of a binary and a subsequent version of the binary, identifying a code portion that is included in the later version and not in the first version, and generating a fingerprint or other identifying technique of the code portion. In some exemplary embodiments, binaries from two versions may be compared before and after the added patch in order to detect the differences, including the patch, and extract a binary signature therefrom. In some exemplary embodiments, the binary signature of the patch may be searched for in the tested binary, to determine whether it includes the patch. In some cases, the signature of the fixed or patched code may be represented with an abstract, high representation that is address-independent, architecture-independent, or the like. For example, in case the patch comprises an added an "if" condition with a comparison to a specific integer, the signature of the patch may be generated to comprise a logical representation of the instruction rather than the binary opcodes itself. Alternatively, the signature of the patch may comprise any other representation of the patch.

In some exemplary embodiments, based on the comparison, a patch may or may not be identified in the binary, and properties thereof such as their software version compliance may be determined. For example, a patch may be determined to prevent a CVE, similarly to the new software version's CVE protection, thereby determining that the system is not vulnerable to the CVE.

In some exemplary embodiments, a preventing factor of a CVE may comprise an applicable configuration that may or may not prevent exploitation of a vulnerability. In some exemplary embodiments, a configuration contextual factor may retain configurations that prevent exploitations of the CVE, vulnerable configurations that enable exploitations of the CVE, mitigating configurations of the CVE, or the like. In some exemplary embodiments, a vulnerability may often apply only to specific configurations of a software, firmware, hardware, or the like. For example, a network software may comprise a vulnerability that can only be exploited in case its Internet Protocol version 6 (IPv6) configuration is enabled. According to this example, in case the IPv6 configuration is disabled, exploitation of the CVE may be determined to be prevented. In some exemplary embodiments, a list of vulnerable configurations for CVEs, mitigating configurations for CVEs, or the like, may be detected in the execution environment using binary analysis, control flow analysis, data flow analysis, configuration file parsing, or the like.

For example, the WolfSSL embedded Secure Sockets Layer (SSL) library, when configured without the "--enable-tls13" option, may not be vulnerable to attacks involving TLS v1.3 (e.g. CVE-2020-24613). In some exemplary embodiments, the WolfSSL library may be determined to be configured without the "--enable-tls13" option based on the library's binary such as by parsing its symbol table and ensuring that the symbol table does not comprise function names with the string "TLS v1.3" or similar string names, indicating that support for TLS v1.3 is not available in the WolfSSL library used by the execution environment. As another example, the LINUX™ kernel, when compiled with the setting "CONFIG_USER_NS=n", may not be vulnerable to attacks exploiting kernel user namespaces (e.g. CVE-2017-6074), as can be determined from the kernel's symbol table.

In some exemplary embodiments, additional examples of applicable configurations may include software attributes such as build-time settings enabling or disabling vulnerable features, configuration file contents enabling or disabling vulnerable features, vulnerable plugins installed, the UNIX™ access rights flag of Set User Identity (ID) (SetUID) bit being set—conferring additional privileges to the executable, command line parameters passed on invocation to indicate vulnerable control flows, specific flags or parameters passed to functions to indicate vulnerable control flows, or the like. In some exemplary embodiments, applicable configurations may include system-wide attributes such as firewall rules that can block packets used in an exploit, kernel components enabled or disabled, kernel and system configuration settings, network or BLUETOOTH™ interfaces enabled or disabled, or the like.

In some exemplary embodiments, contextual factors that do not entirely prevent exploitations of CVEs may nevertheless mitigate or reduce a risk of exploitations of CVEs. In some exemplary embodiments, in case mitigating factors attributes are identified during the contextual analysis of the execution environment, they may decrease the computed impact level or score of a CVE, affect the rating and order of an output CVE list, or the like, since the CVE may pose less of a threat. In some exemplary embodiments, mitigating factors may mitigate an exploitation of a CVE, increase a difficulty of exploiting a CVE, reduce a risk of an exploitation, or the like.

In some exemplary embodiments, one or more mitigating factors may comprise protections against exploitations that are relevant to the CVE, e.g., as defined in the CWE in the CVE record. For example, executables with enabled stack protectors may be less vulnerable to exploitations of CVEs with the "stack overflow" CWE, as such exploitations may be mitigated. In some exemplary embodiments, mitigating factors or protections may comprise Position Independent Executable, which may be utilized against Return-Oriented Programming (ROP) attacks, Stack Smashing Protector ("stack canaries") and Non-Executable Stacks or Heaps, which may be used against stack overflows, FORTIFY-_SOURCE runtime protection, which may be utilized against certain buffer overflow attacks, Control Flow Integrity (CFI) runtime protection, Control Flow Guard (CFG) runtime protection, Relocation Read Only (RELRO), Immediate symbol binding, rpath setting, or the like.

In some exemplary embodiments, exploitation mitigating factors may comprise compiler flags, which may be configured to protect one or more vulnerable code portions, by indicating whether the vulnerable binary (or the loading executable in case of a library) has relevant compiler protections, which may be added during compile time of the binary. In some exemplary embodiments, the presence of the compiler flags in the binary image may be determined by parsing the executable's header, by examining the relevant code sections, or the like. In some exemplary embodiments, additional protections that may be identified may comprise sanitation stages that prohibit to perform illegal access to the memory, defensive programming stages that cause autonomous recovery to be performed, or the like.

In some exemplary embodiments, exploitation mitigating factors may comprise network accessibility factors, attributes, or the like, indicating whether a vulnerable binary portion has network access. In some exemplary embodiments, binary portions that do not have access to any network may reduce a possibility of performing exploitations. In some exemplary embodiments, the network access of the vulnerable binary may be determined, for examples, in case the vulnerable binary creates listening sockets, in case listening sockets are located in the execution environment, or the like. In some exemplary embodiments, network accessibility factors may be identified by locating network functions such as "listen( )" in the binary, associated libraries, or the like. In some cases, the reachability of located network functions may be examined, to identify which code portions are potentially affected via the network. In some exemplary embodiments, vulnerabilities that can be exploited over the network vector, such as indicated by the CVE's "Attack Vector" field in the CVE entry, may be protected at least partially in case the CVE has no network access.

In some exemplary embodiments, exploitation mitigating factors may comprise an execution configurations of the binary. In some exemplary embodiments, in case the binary is configured to be executed by launching a vulnerable binary portion by default on system boot or during system initialization, this may mitigate exploitations. In some exemplary embodiments, the launching configuration may be determined by searching for executables' paths in system scripts, tracking library dependencies of libraries and executables, or the like. In some exemplary embodiments, the binary may be configured to be executed by more than one program, binary, component, or the like. In some exemplary embodiments, in case the vulnerable binary portion is configured to be launched by an additional process, component, script or binary, the device may be less protected than otherwise, thereby increasing a risk of exploitation. In some exemplary embodiments, having a single configured source for launching the binary may mitigate exploitations and reduce a risk of exploitation. Above described techniques may be applied, in addition to binary analysis, on shell or subprocess creation functions.

In some exemplary embodiments, exploitation mitigating factors may comprise configured privileges of the binary, indicating whether the vulnerable binary is launched with elevated privileges. In some exemplary embodiments, elevated privileges cause most attacks to have a more severe impact on the system, compared to lesser privileges. For example, on LINUX™ systems, a binary may be launched with elevated privileges in case it is executed natively under the "root" account, in case it is executed through any account which is a member of the "sudo" group, which can elevate to root, in case it is executed with an enabled "SetUID" bit, causing the binary to be executed under the owner account which is typically root, or the like, which may increase a risk of exploitation. In case elevated privileges are not identified in the execution environment, the risk of exploitation may be reduced.

In some exemplary embodiments, exploitation mitigating factors may comprise system mitigations such as Mandatory Access Control (MAC) systems in which access to objects or operations is limited, isolation methods employed on the system, system-wide memory protections such as ASLR, the No-eXecute (NX) bit, Supervisor Mode Execution Prevention (SMEP), Supervisor Mode Access Protection (SMAP), or the like. In some exemplary embodiments, system properties and constraints may cause exploitations of CVEs to become more difficult, thereby mitigating exploitations and reducing their risk. In some exemplary embodiments, the status of the system mitigations properties may be determined based on an architecture of the Central Processing Unit (CPU) of the underlying device, the operating system to which the binary has been compiled to, by checking operating system settings recorded in the execution environment such as LINUX™ kernel configurations, or the like.

In some exemplary embodiments, exploitation mitigating factors may comprise identifying that the CVE has no known public exploit. In some exemplary embodiments, CVEs may be considered more severe if a public exploit of the CVE is available, and less severe otherwise. In some exemplary embodiments, public CVE databases may publish links to confirmed exploits of the CVE. In case no exploit exists in such databases, exploiting the CVE may be more difficult, thereby reducing the impact rating of the CVE in a computed relevancy score thereof, e.g., in Step 140.

In some exemplary embodiments, the context factors of a system, e.g., a personal computer, mobile device, or the like, may change frequently when the system is under development, making it challenging to adjust the CVE ranking to the changing context. Therefore, the disclosed subject matter may be advantageously implemented for a system in runtime, after development, such as a system image or a closed container of code.

On Step 140, the contextual factors of the execution environment, as identified in Step 130, may be applied to each of the detected vulnerabilities of the binary, in order to identify whether the detected vulnerabilities are prevented, mitigated, have increased risk of exploitation, or the like, in view of the contextual factors. In some exemplary embodiments, after determining contextual factors, an impact computation of each of the CVEs may be performed. In some exemplary embodiments, the impact computation may be determined by applying contextual factors of the execution environment on each identified vulnerability, to identify whether the vulnerability is mitigated, prevented, enabled, increased in risk, or the like. In some exemplary embodiments, the list of CVEs may be processed by identifying, for each CVE, whether or not it poses a danger to the underlying device, a type or severity of the danger, and what is the risk or probability of the danger, as derived from the contextual factors.

In some exemplary embodiments, each contextual factor that was identified may be assigned a relevance score for a CVE in a canonical form, such as with a value ranging from 0 to 1, or in any other range or format. For example, in case a factor is not relevant for a CVE, the relevance score may be low, e.g., zero. In some exemplary embodiments, assigning a relevance score to a factor may depend on whether or not the factor has been partially or fully detected for the CVE, whether the factor affects the CVE, a level or relevance of the factor to the CVE, a level or protection or mitigation that can be indicated by the factor, a level of risk that is indicated by the factor, which portion of the execution environment can be affected by the CVE, or the like.

In some exemplary embodiments, the relevance scores may be converted to a canonical score of the CVE by multiplying each contextual factor or attribute by a weight factor, indicating the importance of the factor for the CVE, and the results may be added up. In some exemplary embodiments, the sum of the results may then be divided by a fixed value to produce a canonical or normalized score in a defined range. In some exemplary embodiments, a score of the CVE may be computed by using a polynomial weight function to its associated factors, or using any other method, weight function, canonical form, or the like.

In some exemplary embodiments, device-specific list of vulnerabilities may be provided, generated, determined, or the like, according to the combined relevance score of each CVE. In some exemplary embodiments, the combined relevance score of each CVE may indicate an actual exploitability of the CVE impacting the underlying product or device, rather than an abstract general score such as the CVSS score. In some exemplary embodiments, a lower rank of vulnerabilities that are protected, that do not enable exploitation, or the like, such as vulnerabilities that cannot be reached, that are patched, or the like, may be removed from the list of CVEs, may not be added to the device-specific list of vulnerabilities, or the like. Alternatively, the vulnerabilities may not be removed but rather allocated a low score and positioned at the end of the list. In some exemplary embodiments, the lower rank of vulnerabilities that are removed from the list or reduced in position may comprise vulnerabilities that have an "absolute" factor that completely negates the issue, such as in case a patch is found, a configuration is not applicable, or the like. In some exemplary embodiments, the remaining vulnerabilities that are estimated to remain exploitable in some degree in the underlying device, may be included in the device-specific list of vulnerabilities. Alternatively, the remaining vulnerabilities may be removed in case their estimated risk is below a risk threshold.

In some exemplary embodiments, in a first exemplary scenario, a Linux kernel of version 5.0 may be detected in the execution environment. In some exemplary embodiments, the kernel of version 5.0 may be determined to be vulnerable to a CVE such as CVE-2019-15666 with a CVSS score of 4.4. In some exemplary embodiments, in the collected contextual factors, kernel compiler flags may be detected in the binary. In some exemplary embodiments, the contextual analysis may detect that CONFIG_USER_NS and CONFIG_XFRM_USER kernel flags are enabled in the execution environment, indicating that a published exploit exists in the underlying product. In some exemplary embodiments, in order to reflect this, the CVE may be scored as critical, in contrast to scoring the CVE according to its CVSS low score of 4.4, which would prioritize it below tens of other less relevant CVEs.

In a second exemplary scenario, a GNU C Library (glibc) of version 2.2 may be detected in the binary image. In some exemplary embodiments, the glibc library may be determined to be vulnerable to a certain CVE such as CVE-2015-0235 having a high CVSS score such as a score of 10.0. In some exemplary embodiments, in the contextual analysis, data on API usages in the system's executables may be collected, accumulated, or the like. In some exemplary embodiments, a contextual analysis or scan may verify the usage or reachability of portions of the glibc library that are vulnerable, such as API functions gethostbyname and gethostbyname2, by searching the execution environment or the binary for calls to the vulnerable API functions. In case calls to gethostbyname or gethostbyname2 are not detected, the vulnerability may be scored as mitigated, prevented, or the like, thereby allocating a low score to the CVE or entirely removing the CVE from the generated list of CVEs. This is in contrast to scoring the CVE according to its relatively high CVSS score of 10 points, which would place it at the top of the list, thereby shadowing more important and relevant CVEs that are not mitigated in the current execution environment.

Figure 2:
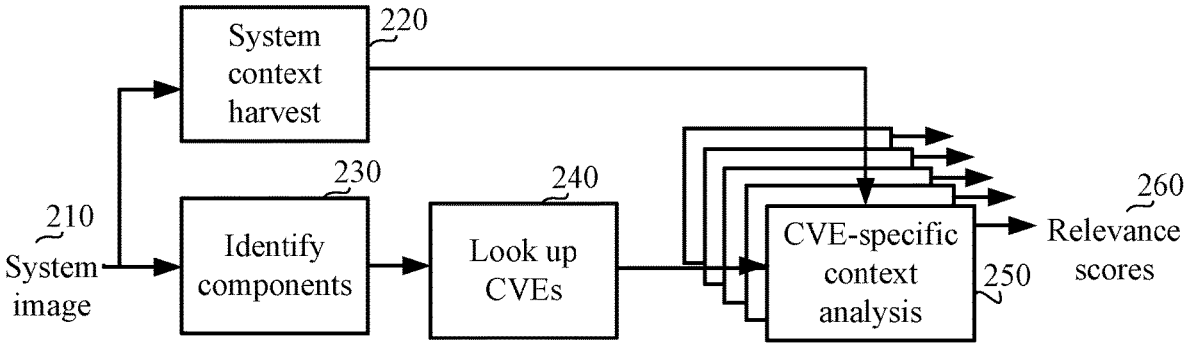
FIG. 2 illustrates a schematic illustration of an exemplary data flow, in accordance with some exemplary embodiments of the disclosed subject matter.

Referring now to FIG. 2 showing an exemplary data flow, in accordance with some exemplary embodiments of the disclosed subject matter.

In some exemplary embodiments, System Image 210 may comprise a system image of an underlying system, product, user device, or the like, that is being tested for vulnerabilities. In some exemplary embodiments, System Image 210 may indicate an execution environment with a binary, configurations, settings, or the like, which may be used in an Identify Components 230 phase that is configured to identify components of System Image 210. Based on the identified components, lookup keys may be determined and subsequently used to lookup relevant vulnerabilities at a Lookup CVEs 240 phase. In some exemplary embodiments, during the Lookup CVEs 240 phase, the lookup key may be used to extract or retrieve vulnerabilities from one or more databases, repositories, servers, or the like, that retain entries of CVEs along with one or more properties such as CVSS scores.

In some exemplary embodiments, simultaneously to performing the Identify Components 230 phase, the Lookup CVEs 240 phase, or in any other partially overlapping or non-overlapping timeframe, a System Context Harvest 220 phase may be performed, initiated, or the like. In some exemplary embodiments, System Context Harvest 220 may perform a contextual analysis of System Image 210, in order to determine contextual factors and configurations thereof that may affect one or more vulnerabilities.

In some exemplary embodiments, after performing the Lookup CVEs 240 phase, and obtaining a list of CVEs that are associated to System Image 210, System Image 210 may use the contextual factors obtained from the System Context Harvest 220 phase, in order to determine whether or not they prevent or mitigate the vulnerabilities found by the Lookup CVEs 240 phase. In some exemplary embodiments, for each CVE in the identified list of CVEs, a CVE-Specific Context Analysis 250 phase may be performed in order to identify whether the contextual factors prevent the vulnerability entirely, reduce the probability of exploiting the vulnerability, increase the probability of exploiting the vulnerability, or the like. In some exemplary embodiments, after performing the CVE-Specific Context Analysis 250 for each CVE in the list of CVEs, new Relevance Scores 260 may be computed for each CVE according to their relevancy in the execution environment, taking into account the contextual factors.

Figure 3:
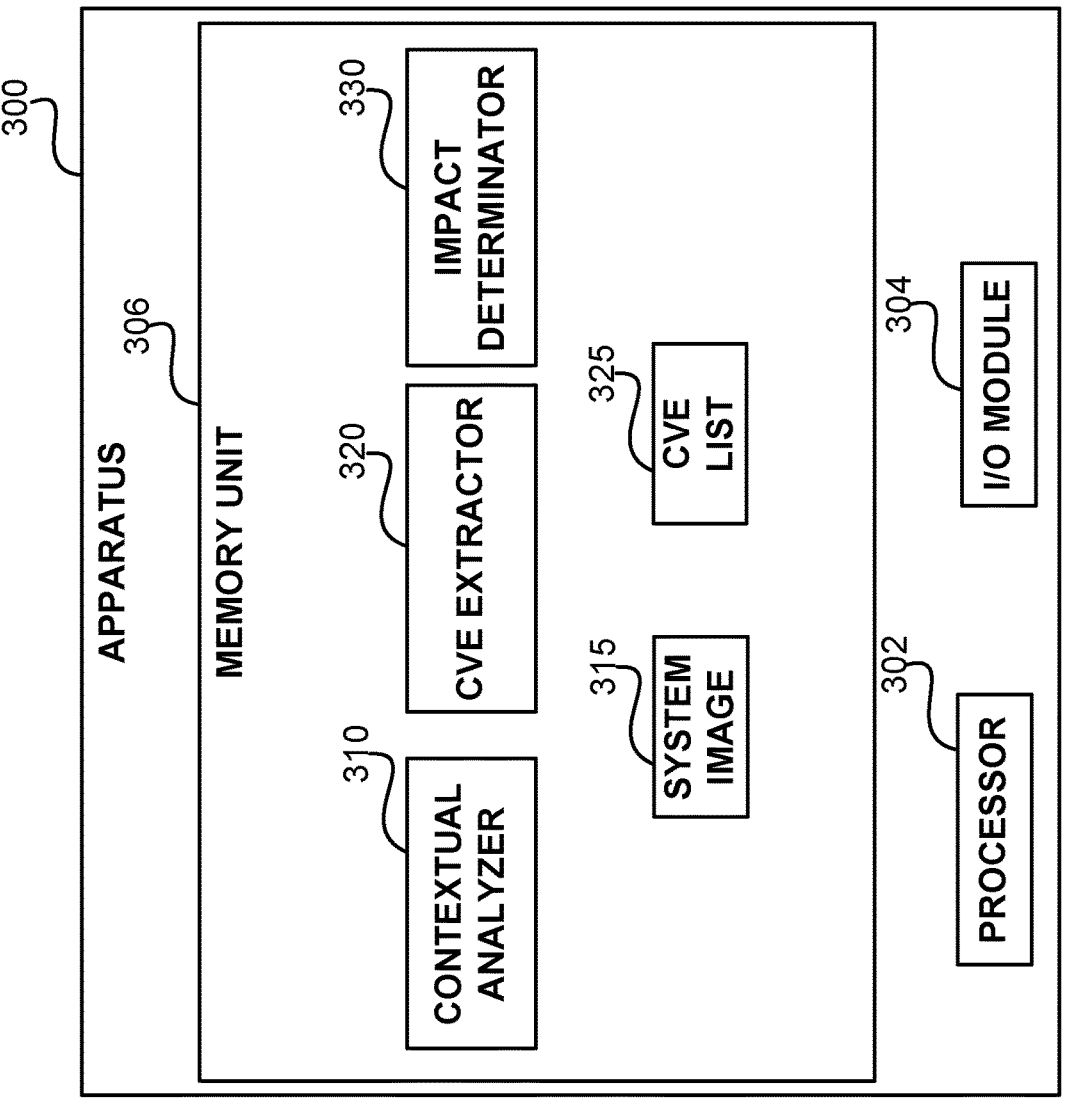
FIG. 3 illustrates a block diagram of an apparatus, in accordance with some exemplary embodiments of the disclosed subject matter.

Referring now to FIG. 3 showing a block diagram of components of an apparatus, in accordance with some exemplary embodiments of the disclosed subject matter.

In some exemplary embodiments, Apparatus 300 may comprise a Processor 302. Processor 302 may be a Central Processing Unit (CPU), a microprocessor, an electronic circuit, an Integrated Circuit (IC) or the like. Processor 302 may be utilized to perform computations required by Apparatus 300 or any of its subcomponents. Processor 302 may be configured to execute computer-programs useful in performing the method of FIG. 1, or the like.

In some exemplary embodiments of the disclosed subject matter, an Input/Output (I/O) Module 304 may be utilized to provide an output to and receive input from a user. I/O Module 304 may be used to transmit and receive information to and from the user or any other apparatus in communication therewith, such as a server retaining entries of CVEs and associated properties.

In some exemplary embodiments, Apparatus 300 may comprise a Memory Unit 306. Memory Unit 306 may be a short-term storage device or long-term storage device. Memory Unit 306 may be a persistent storage or volatile storage. Memory Unit 306 may be a disk drive, a Flash disk, a Random Access Memory (RAM), a memory chip, or the like. In some exemplary embodiments, Memory Unit 306 may retain program code operative to cause Processor 302 to perform acts associated with any of the subcomponents of Apparatus 300. In some exemplary embodiments, Memory Unit 306 may retain program code operative to cause Processor 302 to perform acts associated with any of the steps in FIG. 1, the phases of FIG. 2, or the like.

In some exemplary embodiments, Memory Unit 306 may retain a system image, e.g., System Image 315. In some exemplary embodiments, System Image 315 may comprise a copy of a device's state, such as the firmware of a device, a software of a device, a software container, a mobile application, an individual software package, used libraries or APIs, source code, compiler protections, configurations, settings, or the like. In some exemplary embodiments, System Image 315 may be retained within a device that is tested for vulnerabilities in runtime, e.g., a user device, a laptop, a smartphone, an IoT device, an embedded device, a wearable device, or the like, in which Apparatus 300 resides. In some cases, System Image 315 may comprise an execution environment. In other cases, System Image 315 may comprise a binary including source code, high level code, or the like, that is not compiled, which may exclude compiler attributes. System Image 315 may have one or more associated vulnerabilities.

In some exemplary embodiments, Memory Unit 306 may retain a list of one or more vulnerabilities of System Image 315, e.g., a CVE List 325 with CVSS scores for each of System Image 315's associated vulnerabilities.

The components detailed below may be implemented as one or more sets of interrelated computer instructions, executed for example by Processor 302 or by another processor. The components may be arranged as one or more executable files, dynamic libraries, static libraries, methods, functions, services, or the like, programmed in any programming language and under any computing environment.

In some exemplary embodiments, Memory Unit 306 may comprise a Contextual Analyzer 310. In some exemplary embodiments, Contextual Analyzer 310 may analyze System Image 315 in order to identify contextual factors of the underlying system such as properties, attributes, configurations, or the like, that can prevent exploitation of vulnerabilities, mitigate exploitation of vulnerabilities, increase a risk of exploitation of vulnerabilities, or the like.

In some exemplary embodiments, Memory Unit 306 may comprise a CVE Extractor 320. In some exemplary embodiments, CVE Extractor 320 may be configured to identify vulnerabilities of System Image 315, and produce the CVE List 325 with CVSS scores for each of System Image 315's vulnerabilities.

In some exemplary embodiments, Memory Unit 306 may comprise an Impact Determinator 330. In some exemplary embodiments, Impact Determinator 330 may be configured to determine an impact of each vulnerability that is listed in the CVE List 325 on the device, based on whether or not contextual factors prevent, mitigate, or increase a risk of exploiting the vulnerabilities. In some exemplary embodiments, based on a determined impact of each vulnerability, Impact Determinator 330 may modify the list of vulnerabilities, e.g., the CVE List 325, to remove therefrom vulnerabilities that prevent exploitation, and to rank or order the remaining vulnerabilities according to their estimated impact.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product comprising a non-transitory computer readable storage medium retaining program instructions, which program instructions when read by a processor of a device, cause the processor of the device to:

obtain a list of vulnerabilities of an execution environment of the device; wherein each listed vulnerability in the list of vulnerabilities is assigned with a score;

analyze the execution environment of the device to determine one or more device-specific contextual factors of the execution environment of the device; and adjust the list of vulnerabilities based on the one or more contextual factors, thereby providing a device-specific list of vulnerabilities, wherein the device-specific list of vulnerabilities is configured to indicate for each vulnerability listed in the list of vulnerabilities, an estimated impact of the each listed vulnerability on the device, wherein the adjustment of the list of vulnerabilities by the processor of the device comprises at least one of:

removing a first vulnerability from the list of vulnerabilities in case that exploitation of the first vulnerability is prevented in the device by the one or more contextual factors, whereby the device-specific list of vulnerabilities excludes the first vulnerability;

decreasing a score of a second vulnerability of the list of vulnerabilities in case that the one or more contextual factors mitigate an exploitation of the second vulnerability, whereby the device-specific list of vulnerabilities includes the second vulnerability with a decreased score; or increasing a score of a third vulnerability of the list of vulnerabilities in case that the one or more contextual factors increase a risk of an exploitation of the third vulnerability, whereby the device-specific list of vulnerabilities includes the third vulnerability with an increased score;

wherein the one or more contextual factors comprise a mitigating factor, wherein the mitigating factor is a factor that is configured to be utilized in mitigating an exploitation of a vulnerability; and wherein the mitigating factor comprises compiler flags configured to protect one or more vulnerable code portions by indicating whether the vulnerability has relevant compiler protections.

2. The computer program product of claim 1, wherein the processor is adapted to obtain the list of vulnerabilities by:

analyzing the execution environment to extract identifiers of software modules thereof, determining lookup keys based on the identifiers of the software modules, and extracting the list of vulnerabilities from a database using the lookup keys.

3. The computer program product of claim 1, wherein the list of vulnerabilities comprises a list of respective Common Vulnerability Enumerations (CVEs), wherein the list of CVEs is associated with respective Common Vulnerability Scoring System (CVSS) scores.

4. The computer program product of claim 3, wherein the second vulnerability is associated with a high CVSS score, wherein the third vulnerability associated with a low CVSS score, wherein the high CVSS score of the second vulnerability is greater than the low CVSS score of the third vulnerability, wherein after said decreasing and said increasing, the score of the third vulnerability is greater than the score of the second vulnerability in the device-specific list of vulnerabilities.

5. The computer program product of claim 4, wherein the device-specific list of vulnerabilities lists the third vulnerability before the second vulnerability.

6. The computer program product of claim 1, wherein the scores of the second and third vulnerabilities correspond to a position of the second and third vulnerabilities in the device-specific list of vulnerabilities.

7. The computer program product of claim 1, wherein the program instructions, when read by the processor, cause the processor to:

determine that an anticipated modification to the execution environment is operative to cause a change to the one or more contextual factors; and determine an effect of the change to the one or more contextual factors on the device-specific list of vulnerabilities.

8. The computer program product of claim 7, wherein the program instructions, when read by the processor, cause the processor to:

determine that the effect comprises adding the first vulnerability to the device-specific list of vulnerabilities; and in response to the determination that the effect comprises adding the first vulnerability, alert a user that the potential modification causes the device to be vulnerable to an exploitation of the first vulnerability.

9. The computer program product of claim 1, wherein the one or more contextual factors comprise a preventing factor, wherein the preventing factor, wherein the preventing factor is a factor that is configured to be utilized in preventing an exploitation of a vulnerability.

10. The computer program product of claim 9, wherein the program instructions, when read by the processor, cause the processor to refrain from including the vulnerability in the device-specific list of vulnerabilities.

11. A method comprising:

by a processor of a device, obtaining a list of vulnerabilities of an execution environment of the device;

by the processor of the device analyzing the execution environment of the device to determine one or more device-specific contextual factors of the execution environment of the device; and by the processor of the device adjusting the list of vulnerabilities based on the one or more contextual factors, thereby providing a device-specific list of vulnerabilities, wherein the device-specific list of vulnerabilities is configured to indicate for each vulnerability listed in the list of vulnerabilities, an estimated impact of the each listed vulnerability on the device, wherein said adjusting of the list of vulnerabilities by the processor of the device comprises at least one of:

by the processor of the device removing a first vulnerability from the list of vulnerabilities in case that exploitation of the first vulnerability is prevented in the device by the one or more contextual factors, whereby the device-specific list of vulnerabilities excludes the first vulnerability;

by the processor of the device modifying a score of a second vulnerability of the list of vulnerabilities in case that the one or more contextual factors mitigate an exploitation of the second vulnerability, whereby the device-specific list of vulnerabilities includes the second vulnerability with a decreased score; or by the processor of the device modifying a score of a third vulnerability of the list of vulnerabilities in case that the one or more contextual factors increase a risk of an exploitation of the third vulnerability, whereby the device-specific list of vulnerabilities includes the third vulnerability with an increased score;

wherein the one or more contextual factors comprise a mitigating factor, wherein the mitigating factor is a factor that is configured to be utilized in mitigating an exploitation of a vulnerability; and wherein the mitigating factor comprises compiler flags configured to protect one or more vulnerable code portions by indicating whether the vulnerability has relevant compiler protections.

12. The method of claim 11 comprising obtaining the list of vulnerabilities by:

analyzing the execution environment to extract identifiers of software modules thereof, determining lookup keys based on the identifiers of the software modules, and extracting the list of vulnerabilities from a database using the lookup keys.

13. The method of claim 11, wherein the list of vulnerabilities comprises a list of respective Common Vulnerability Enumerations (CVEs), wherein the list of CVEs is associated with respective Common Vulnerability Scoring System (CVSS) scores.

14. The method of claim 11, wherein the scores of the second and third vulnerabilities correspond to a position of the second and third vulnerabilities in the device-specific list of vulnerabilities.

15. The method of claim 11 comprising:

determining that an anticipated modification to the execution environment is operative to cause a change to the one or more contextual factors; and determining an effect of the change to the one or more contextual factors on the device-specific list of vulnerabilities.

16. The method of claim 11, comprising refraining from including the vulnerability in the device-specific list of vulnerabilities.

17. A system implemented on a device, the system comprising a processor of the device and a coupled memory, the processor of the device being adapted to:

obtain a list of vulnerabilities of an execution environment of the device;

analyze the execution environment of the device to determine one or more device-specific contextual factors of the execution environment of the device; and adjust the list of vulnerabilities based on the one or more contextual factors, thereby providing a device-specific list of vulnerabilities, wherein the device-specific list of vulnerabilities by the processor of the device is configured to indicate for each vulnerability listed in the list of vulnerabilities, an estimated impact of the each listed vulnerability on the device, wherein the adjustment of the list of vulnerabilities by the processor of the device comprises at least one of:

removing a first vulnerability from the list of vulnerabilities in case that exploitation of the first vulnerability is prevented in the device by the one or more contextual factors, whereby the device-specific list of vulnerabilities excludes the first vulnerability;

decreasing a score of a second vulnerability of the list of vulnerabilities in case that the one or more contextual factors mitigate an exploitation of the second vulnerability, whereby the device-specific list of vulnerabilities includes the second vulnerability with a decreased score; or increasing a score of a third vulnerability of the list of vulnerabilities in case that the one or more contextual factors increase a risk of an exploitation of the third vulnerability, whereby the device-specific list of vulnerabilities includes the third vulnerability with an increased score;

wherein the one or more contextual factors comprise a mitigating factor, wherein the mitigating factor is a factor that is configured to be utilized in mitigating an exploitation of a vulnerability; and wherein the mitigating factor comprises compiler flags configured to protect one or more vulnerable code portions by indicating whether the vulnerability has relevant compiler protections.

18. The computer program product of claim 1, wherein said analysing the execution environment of the device is performed by analysing a system image of the execution environment of the device, wherein the system image comprises at least one of: a firmware of the device, a software of the device, or a software container.

* * * * *